May 2, 1944.  A. E. REINHARDT ET AL  2,348,149
FORMULA COMPOUNDING APPARATUS
Filed April 18, 1941   4 Sheets-Sheet 1
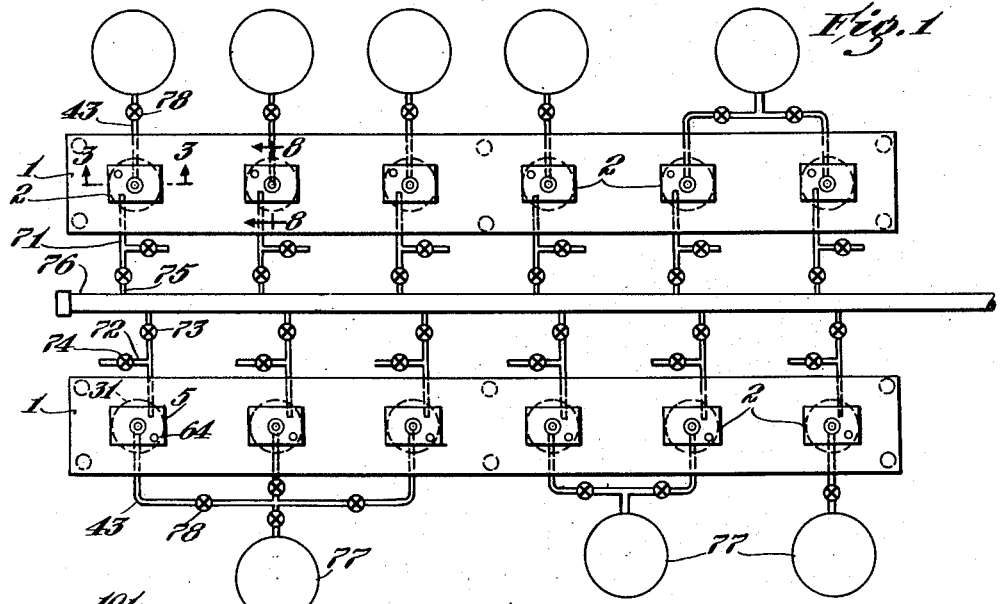
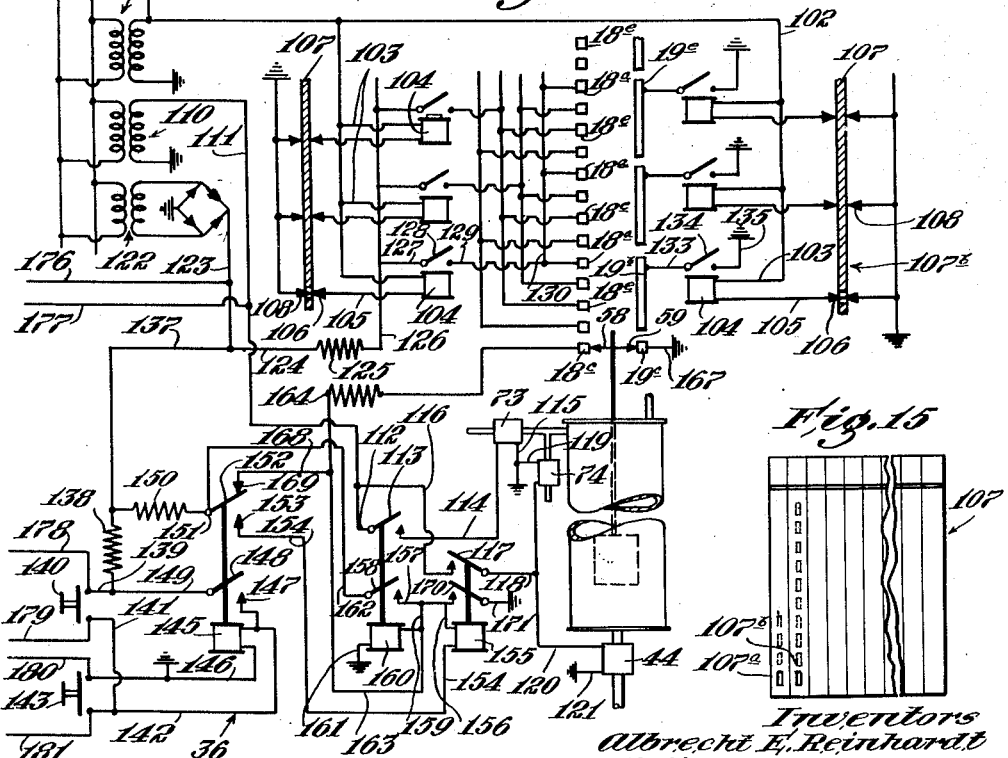
Inventors
Albrecht E. Reinhardt
Matthijs G. J. Boissevain
Ascher H. Shapiro
Charles G. Cady
by Roberts, Cushman & Woodbury
Attys.

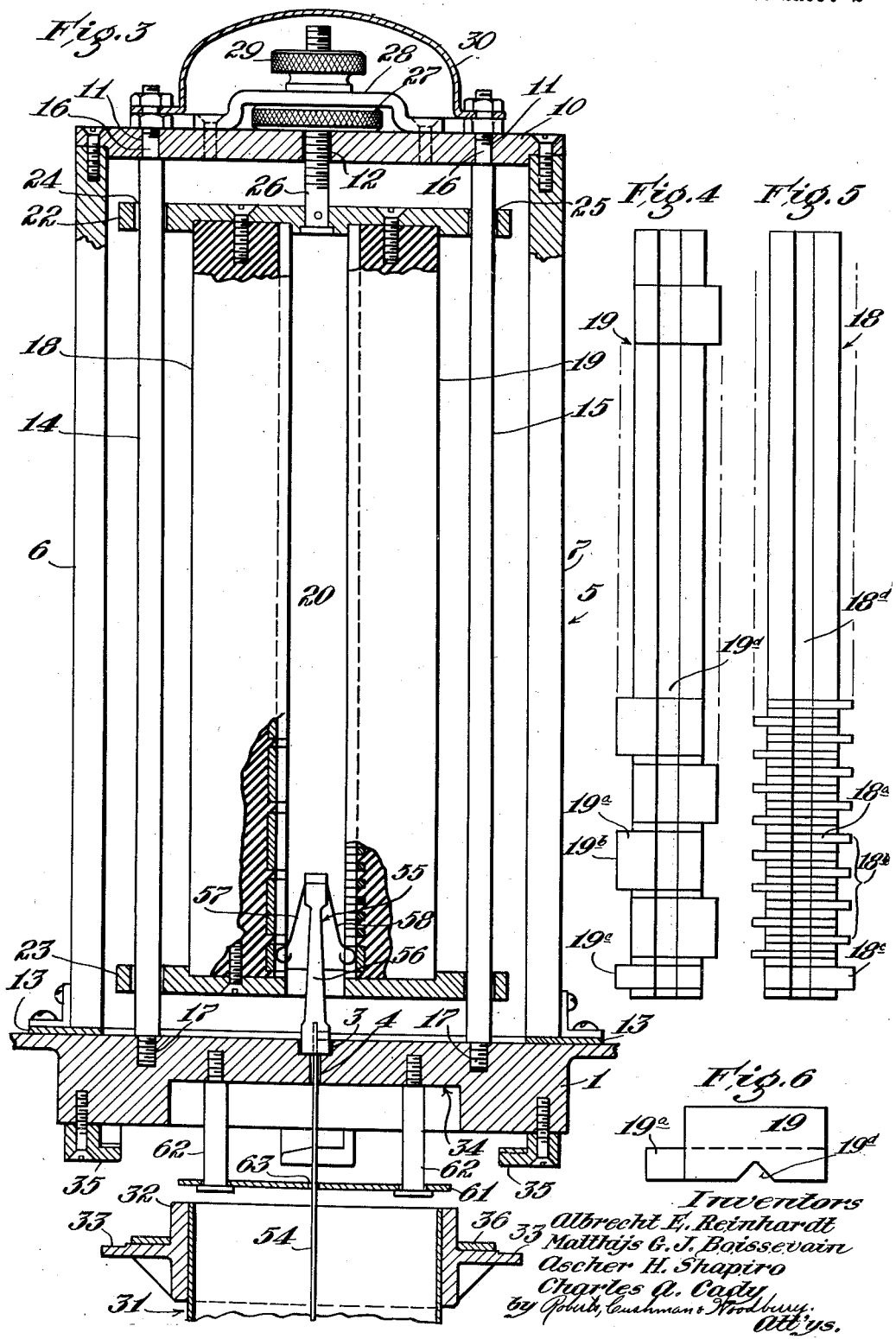

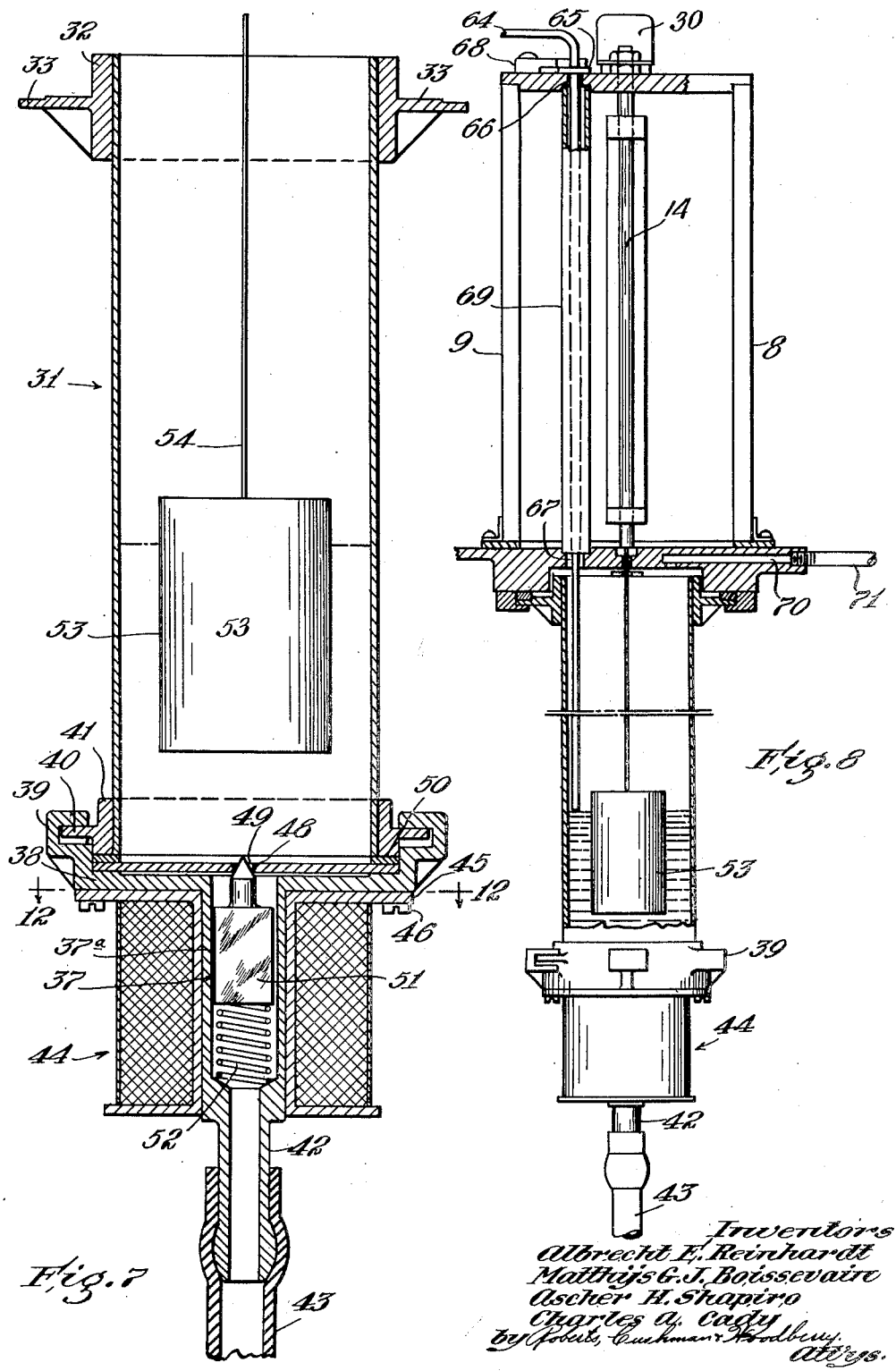

May 2, 1944.　　A. E. REINHARDT ET AL　　2,348,149
FORMULA COMPOUNDING APPARATUS
Filed April 18, 1941　　4 Sheets-Sheet 4
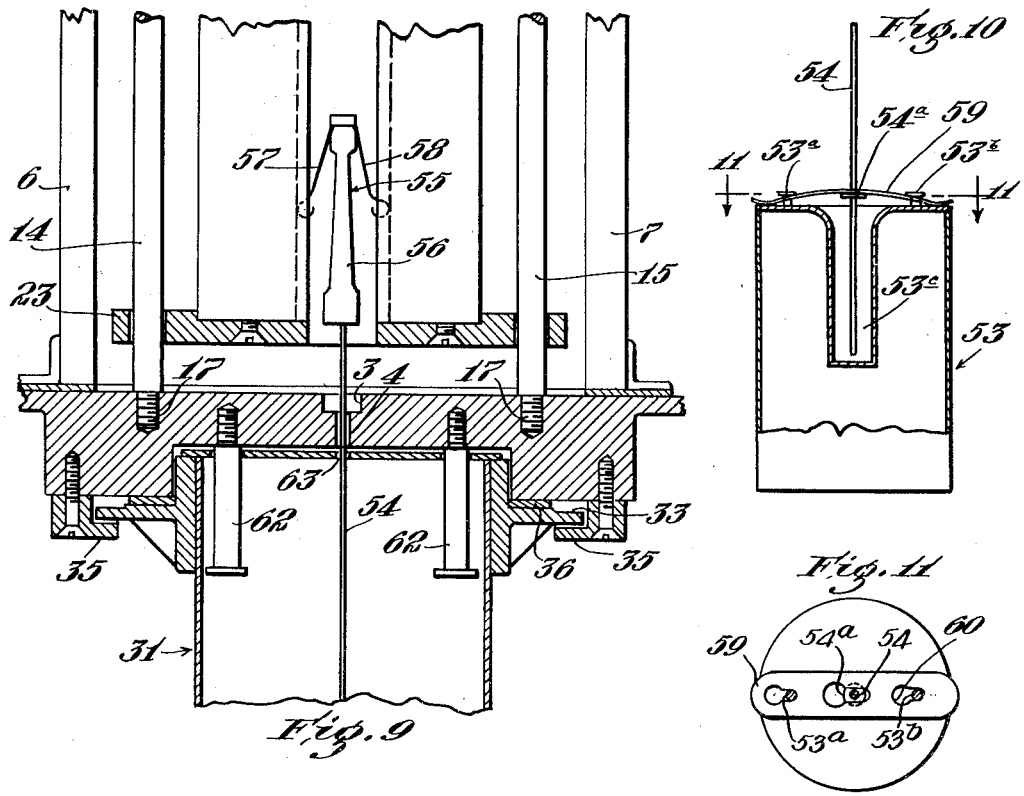
Inventors
Albrecht E. Reinhardt
Matthijs G. J. Boissevain
Ascher H. Shapiro
Charles A. Cady
by Roberts, Cushman & Woodbury
Attys.

Patented May 2, 1944

2,348,149

UNITED STATES PATENT OFFICE 2,348,149

FORMULA COMPOUNDING APPARATUS

Albrecht E. Reinhardt, Milton, Matthijs G. J. Boissevain, Arlington, Ascher H. Shapiro, Cambridge, and Charles A. Cady, Boston, Mass., assignors, by mesne assignments, to International Business Machines Corporation, New York, N. Y., a corporation of New York Application April 18, 1941, Serial No. 389,158

4 Claims. (Cl. 222—14)

This invention relates to the art of metering and more particularly to a formula-compounding apparatus for metering predetermined quantities of a plurality of predetermined ingredients such as are necessary, for example, in compounding baby formulae.

In the compounding of formulae numerous different ingredients in varying amounts are inevitably required and one formula may require exactly the same ingredients as another, but in completely different amounts. Further prerequisites to formulae compounding include adaptability to instant change from one formula to a completely different one, precise accuracy of measurement and a thoroughly sanitary environment.

One object of this invention resides in the provision of a formula-compounding apparatus which will select predetermined ingredients of any given formula and the predetermined amounts thereof and will meter the same, said apparatus thereafter being in immediate readiness either to repeat the metering of the same formula or to compound a new formula differing in ingredients as well as the amounts thereof.

Another object of the invention is to provide a formula-compounding apparatus instantaneously prepared and adapted to compound completely different formulae without regulation or alteration of any part of the metering or selecting apparatus.

A further object of the invention is the provision of a formula-compounding apparatus which will reduce the possibility of human error to a minimum and will maintain precise accuracy of measurement no matter how large or small the amount desired to be metered.

Another object of the invention is the provision of a formula-compounding apparatus which will operate with the speed, flexibility and efficiency essential to the successful commercial production of various formulae.

A further object of this invention is to provide a formula-compounding apparatus of the construction which will permit of simple assembly and disassembly for sterilization purposes so that a thoroughly sanitary environment may be maintained at all times.

This invention in one aspect resides in measuring and delivering several ingredients of a formula from metering units for the respective ingredients, under the control of selecting means which determines which of the plurality of metering units is to operate and how much of its respective ingredient each selected unit is to meter and deliver. As shown and described in the preferred embodiment set forth below, control means associated with each metering unit cooperate with the selecting means to control the metering and delivery of the amount selected. In said preferred embodiment the selecting means comprises a card reading selector, common to the plurality of metering units adapted to initiate electrical impulses according to designations on the card, which impulses preset the cooperative control means of each selected metering unit.

In another aspect the invention resides in the combination of a metering unit having a chamber including inlet and outlet ports, means for controlling the flow of fluid into and out of said ports, means for indicating the amount of fluid admitted to said chamber, and selective control means responsive to the operation of the indicating means for effecting the discharge of a predetermined quantity of fluid from said chamber.

These and other objects and advantages of the invention will be pointed out hereinafter in the following more detailed description and by reference to the annexed drawings in which:

Fig. 1 is a diagrammatic plan view of one embodiment of the invention showing a plurality of metering units with their associated sources of supply;

Fig. 2 is a schematic diagram of the electrical apparatus associated with each metering unit;

Fig. 3 is an enlarged cross-sectional view taken along line 3—3 of Fig. 1 illustrating the metering control device of one metering unit with metering tube disassembled and parts broken away;

Fig. 4 is a face view of one contact strip of the metering control device of one metering unit;

Fig. 5 is a face view of the opposed contact strip of the metering control device of one metering unit;

Fig. 6 is a plan view of Fig. 4;

Fig. 7 is an enlarged cross-sectional view taken along line 3—3 of Fig. 1 illustrating the metering tube and solenoid inflow valve of one metering unit;

Fig. 8 is an enlarged cross-sectional view taken along line 8—8 of Fig. 1 illlustrating one complete metering unit;

Fig. 9 is an enlarged cross-sectional view taken along line 3—3 of Fig. 1 illustrating the metering control device of one metering unit with the metering tube assembled;

Fig. 10 is a side elevation of a float with parts broken away;

Fig. 11 is a sectional plan view of the float taken along line 11—11 of Fig. 10;

Fig. 12 is a top plan view of the inflow solenoid taken on line 12—12 of Fig. 7;

Fig. 13 is a top plan view of the metering tube of one metering unit;

Fig. 14 is a top plan view of the inflow solenoid valve; and

Fig. 15 is a top plan view of a card illustrating one pair of columns in detail.

The embodiment of the invention selected for illustration comprises a pair of parallel spaced bed plates 1 on which are supported a plurality of metering units 2 (see Fig. 1). Each unit 2 serves to meter and deliver an ingredient of the formula to be compounded, as will be set forth in detail hereinbelow.

The units 2 are uniform in construction and will be described in detail with particular reference to Figs. 3 and 7 considered so positioned as to illustrate a complete unit. In the upper face of the bed plate 1 is formed a recess 3 and an opening 4 leading from the bottom of the recess to the lower face of the plate. The unit 2 includes a housing 5, having side walls 6 and 7, removable front and rear walls 8 and 9, and a removable top 10 fixed to the side walls and provided with openings 11 and 12 mounted upon the bed plate 1, said bed plate constituting the bottom of said housing. Suitable sealing means, such as a gasket 13, disposed between the bottoms of the housing walls and bed plate 1 provides a tight connection.

Within said housing 5 a pair of posts 14 and 15, having at the upper end reduced portions 16 received by the openings 11 in the housing top 10, are disposed in spaced parallel relation to each other and to the side walls 6 and 7 and are secured at the lower end to the bed plate 1 by suitable means, as threaded openings 17, and at the upper end to the housing top 10 by suitable means such as lock nuts. A pair of insulated contact strips 18 and 19 disposed in parallel relation to form a guideway 20 are secured at opposite ends to transverse bars 22 and 23 slidably mounted at their opposite ends by means of openings 24 and 25 upon posts 14 and 15.

Said contact strips 18 and 19 (see Figs. 4 and 5) include adjacent their inner opposed edges a plurality of spaced horizontal terminal bars 18ª and 19ª, respectively, of electric current-conducting material, there being one terminal bar 19ª to four terminal bars 18ª, the contact strips 18 and 19 insulating each terminal bar from the other, as shown in Fig. 3. As shown in Figs. 4 and 5, one end of each terminal bar 18ª and 19ª projects outwardly from contact strips 18 and 19 to provide suitable connecting terminals 18ᵇ and 19ᵇ for suitable wire leads. At the lower end of each contact strip is provided a terminal bar 18ᶜ and 19ᶜ, respectively. Referring more especially to Fig. 5, every fourth terminal bar 18ª is electrically connected together. There are further provided in the center of each spaced horizontal terminal bar 18ª and 19ª and on the inner opposed edges of contact strips 18 and 19, grooves 18ᵈ and 19ᵈ, as shown in Figs. 4, 5 and 6.

Means for vertical adjustment of contact strips 18 and 19 within the housing comprises a screw 26 secured at one end to the center of transverse bar 22 and extended through the opening 12 in housing top 10, and there adjustably held by a thumb nut 27. After adjustment, the screw 26 is locked in position by suitable means, as a yoke 28 and lock nut 29, and is guarded from inadvertent dislocation by casing 30, as shown in Fig. 3.

A metering tube 31 suspended from the bed plate 1 has secured at its top end a collar 32 provided with a plurality of ears 33, as shown in Figs. 3, 7 and 13, and is snugly received into a recess 34 provided in the bottom of the bed plate 1 directly beneath the housing 5, where it is removably secured by suitable means, as clamping lugs 35 cooperative with ears 33. A gasket 36 disposed on the top of brackets 33 adjacent the collar 32 insures a tight connection. An inflow valve 37 comprises an inflow valve cylinder 37ª having at its top an annular flange 38 provided with a plurality of integral inset lugs 39 which cooperate with a plurality of ears 40 provided by collar 41 secured to the bottom of metering tube 31 to removably secure it to said metering tube. The inflow valve cylinder 37ª has an elongate portion 42 at its bottom end to provide a connection for fluid inflow conduit 43, as shown in Fig. 7. A solenoid 44 having a top annular flange 45 is removably secured to annular flange 38 of the valve cylinder 37ª by suitable means, as the cooperation of screws 46 with a plurality of bayonet slots 47 provided in top annular flange 45, as shown in Fig. 12. A valve seat 48 having an opening 49 is received between annular flange 38 and the bottom of metering tube 31 and a close fit is effected by suitable means, as a gasket 50. The armature valve 51 of suitable form, as shown in Figs. 7 and 14, is normally urged against valve seat opening 49 by a spring 52.

A hollow float 53 having lugs 53ª and 53ᵇ and provided on its top with a recessed portion 53ᶜ extending from said top downwardly adjacent the center thereof, is suspended within metering tube 31 by suitable means, as a rod 54, having a collar 54ª adjacent its bottom end. The bottom end of rod 54 is received into recess 53ᶜ and a resilient strip 59 having bayonet slots 60 cooperates with lugs 53ª and 53ᵇ and collar 54ª to removably secure said float to said rod, as shown in Figs. 10 and 11. Said rod extends vertically through opening 4 of bed plate 1 where it is received by a contact member 55 disposed in guideway 20 and has an insulated body portion 56 and two diametrically opposed whiskers 57 and 58. The outer ends of said whiskers are received in the grooves 18ᵈ and 19ᵈ of the contact strips 18 and 19 and are adapted to slide vertically the entire length thereof in response to the rise and fall of float 53.

When float 53 is in its lowest position within metering tube 31, as shown in Figs. 3 and 7, the bottom of contact member 55 is received in the recess 3 of bed plate 1 to prevent any dislocation of the whiskers 57 and 58 from grooves 18ᵈ and 19ᵈ.

To prevent any bending of the rod 54 when metering tube 31 is disassembled from bed plate 1, suitable supporting means are provided at the bottom of bed plate 1, such as bar 61 slidably mounted upon posts 62, secured at their top ends to bed plate 1 and having an opening 63 to receive rod 54. When the metering tube is disassembled from the bed plate 1, the bar 61 drops into the position shown in Fig. 3, providing the necessary support for rod 54. When the metering tube is assembled, bar 61 slides upwardly on posts 62 and 63 and assumes an inoperative position within recess 34, as shown in Fig. 9.

A discharge conduit 64 (Fig. 8) having suitable positioning means, as a sleeve 65 secured adjacent its top, extends through an opening 66 provided in housing top 10 downwardly within the housing 5 through an opening 67 provided in bed plate 1 and thence into metering tube 31 until its bottom end rests just below the top of float 53 when said float is in its lowest position within the metering tube, as there shown. The discharge conduit 64 is removably held in operative position by suitable means, as a latch 68 pivoted at one end to housing top 10 and provided at the other end with fingers which snugly grip said conduit 64 about sleeve 65. Suitable guide means for inserting discharge conduit 64 into position is provided by a cylinder 69 secured within housing 5 at one end to housing top 10 and at the other end to bed plate 1, as shown in Fig. 8.

An elongate opening 70 extends rearwardly and within bed plate 1 from the front thereof to a point short of opening 4 where it turns downwardly to emerge at a point directly above metering tube 31, as shown in Fig. 8, to provide a suitable air port for metering tube 31. An air conduit 71 is connected at one end to the front of opening 70 and at the other end, through a coupling 72, to a conventional solenoid valve 73 for controlling the entry of compressed air into chamber 31 and a conventional solenoid valve 74 for controlling the venting of air from chamber 31, as shown in Fig. 1.

Fig. 1 shows the provision and arrangement of a plurality of metering units, identical to that above described. The housing 5 of each metering unit is mounted on one of the bed plates 1, and similarly the metering tube 31 of each metering unit is suspended from the bottom of said bed plates 1 directly beneath their respective housings. Air conduits 71 of diametrically opposed metering units project inwardly toward each other, and conduits 75 connect each compressed air solenoid valve 73 with a compressed air conduit 76 common to each metering unit and disposed intermediate parallel spaced bed plates 1. Said compressed air conduit 76 connects in turn to a common source of supply (not shown). Ingredient sources of supply 77 for each metering unit, each having a metering tube inflow conduit 43 and a valve 78, are disposed adjacent the outside of parallel spaced bed plates 1 and adjacent the metering tubes they are to supply. As shown in Fig. 1, one ingredient source of supply 77 may serve a plurality of metering units, while others may serve only one. The discharge conduit 64 of each metering tube empties into a common collecting beaker (not shown).

A card reading device used in connection with the electrical apparatus to be hereinafter described has been shown only schematically in Fig. 2, as it is of a well known and conventional type such as a plurality of spaced opposed brushes. When a suitable card 107, as shown in Fig. 15, provided with perforations arranged in columns 107a and 107b, is inserted between said brushes and they are juxtaposed, contact between opposed brushes is established only where a perforation is provided in the card, which contact completes a circuit.

The electrical apparatus will now be described with particular reference to the diagram in Fig. 2. For convenience in explaining the electrical apparatus, columns 107a and 107b of card 107 are shown in cross section at different locations. It will be understood, however, that sets of brushes 106 and 108 provided by the card reading device are actually in a common plane and engage columns 107a and 107b in said plane.

A selector circuit comprises a transformer 101, a branched lead 102, a plurality of leads 103 each connecting the lead 102 to one end of a plurality of solenoids 104. Leads 105 are connected at one end to the opposite end of solenoids 104 and at the other end with a plurality of brushes 106 which contact one side of the card 107 at column 107a. A plurality of brushes 108 contact the other side of the card 107 at column 107a and are connected by suitable leads to ground. As shown in Fig. 2, the same selector circuit, having a common transformer 101 and branch lead 102, provides a plurality of brushes 106 which contact one side of the card 107 at column 107b and a plurality of brushes 108 which contact the other side of said card 107 at column 107b and are in like manner connected by suitable leads to ground.

An actuating circuit for actuating the inflow valve solenoid 44, the vent valve solenoid 74 and the compressed air valve solenoid 73 comprises a transformer 110 and a lead 111. A lead 112 is connected at one end to lead 111 and at the other end to one terminal of a switch 113. A lead 114 connects the opposite terminal of switch 113 to one end of compressed air valve solenoid 73, the opposite end of said solenoid 73 being connected by a lead 115 to the ground. A lead 116 connects lead 111 to one terminal of switch 117, and a lead 118 connects the opposite terminal of the switch 117 to one end of vent valve solenoid 74, the opposite end of said solenoid 74 being connected by lead 119 to the ground. A lead 120 connects lead 118 to one end of inflow valve solenoid 44, the opposite end of said solenoid 44 running by lead 121 to the ground.

Associated with the selector circuit are a plurality of identical metering control circuits, only one of which will be described for the sake of clarity. Said metering control circuit comprises a rectifier 122 and a lead 123 connected in turn to a lead 124 which runs to one end of a resistor 125. Connected to the other end of the resistor 125 is a lead 126. Leads 127 connect the lead 126 to one terminal of switches 128 operatively disposed adjacent the solenoids 104 associated with the column 107a of card 107 in said selector circuit. The opposite ends of the switches 128 are connected by leads 129 and bus lines 130 to every fourth terminal bar 18a of contact strip 18. A lead 133 connects each terminal bar 19a to one terminal of switch 134 operatively disposed adjacent solenoid 104 associated with column 107b of card 107 in said selector circuit. The opposed terminal of switch 134 connects by suitable means as lead 135 to the ground.

Associated with said metering control circuit is a holding circuit comprising the rectifier 122 and lead 123 connected in turn to lead 137, which runs to one end of a resistor at 138. The other end of resistor 138 connects by a lead 139 to one terminal of a starting switch 140. A lead 141 is connected at one end to the opposite terminal of starting switch 140 and at its other end to a lead 142, one end of said lead 142 running to one terminal of a stop switch 143, the other end to a solenoid 145. The opposite end of solenoid 145 is connected by lead 146 to the ground and also to the opposite terminal of stop switch 143. A lead 147 connects lead 142 to one terminal of a switch 148 operatively disposed adjacent solenoid 145. The other terminal of switch 148 is connected by a lead 149 to lead 139 and resistor 138.

Intermediate said metering control circuit and actuating circuit are inflow and outflow control relays supplied from the rectifier 122 through leads 123 and 137. A resistor 150 connects lead 137 to one terminal 151 of a switch 152 operatively disposed adjacent to solenoid 145. One opposite terminal 153 of switch 152 is connected by lead 154 to inflow relay solenoid 155. A lead 156 connects the opposite end of solenoid 155 to a lead 157 which in turn is connected to one terminal of switch 158 disposed immediately below switch 113 of the actuating circuit and adjacent to an outflow relay solenoid 160. A lead 159 connects said terminal of switch 158 to outflow relay solenoid 160, the opposite end of said solenoid being connected to ground by lead 161. A lead 162 connects the opposite terminal of switch 158 with terminal 151 of switch 152. A lead 163 is connected at one end to lead 159 and runs through resistor 164 to terminal bar 18ᶜ of contact strip 18. The whiskers 58 and 59 of contact 55 provide a connection between terminal bar 18ᶜ and a terminal bar 19ᶜ of contact strip 19. A lead 167 connects terminal bar 19ᶜ with the ground. At a point on lead 163 intermediate lead 159 and resistor 164 a lead 168 connects lead 163 to a terminal 169 of switch 152. At the point where lead 156 connects to lead 157 one terminal of a switch 170 is provided, said switch being operatively disposed immediately below switch 117 and adjacent the inflow relay solenoid 155, the opposite terminal of switch 170 being connected to the ground by lead 171. It will be noted that the switches 148 and 152, 158 and 113 and 170 and 117 are moved in unison under impulse of the solenoids 145, 160 and 155, respectively.

The operation of one metering tube and associated electrical apparatus will now be described. Before the starting switch 140 is pressed, all valves 73, 74 and 37 are closed and all switches are open except the switch 152 which is closed on terminal 169, allowing current to flow from rectifier 122 to pass through leads 123, 137, resistor 150, switch 152, leads 168, 163, resistor 164, terminal bar 18ᶜ, whiskers 58 and 59, terminal bar 19ᶜ and lead 167 to the ground.

The card 107 having in the embodiment shown in Fig. 15 a quarter ounce column 107ᵃ and an ounce column 107ᵇ and having openings punched, for example, in each column corresponding to four quarters of an ounce and zero ounces, respectively, is inserted between brushes 106 and 108 of the selector circuit and a contact is immediately made thereby through the punched openings in columns 107ᵃ and 107ᵇ. Current thereupon flows in the selector circuit from transformer 101 through leads 102, 103, the solenoids 104 associated with the fourth of each set of four terminal bars 18ᵃ and the lowest terminal bar 19ᵃ, leads 105 and brushes 106, to brushes 108, to the ground, which energizes such solenoids 104 and causes the closing of the switches 128 and 134 of the metering control circuits associated therewith and also establishes a circuit for holding switches 128 and 134 closed. The closing of switch 128 energizes terminal bars 18ᵃ of contact strip 18, by allowing the current flowing from rectifier 122 through leads 123, 124, resistor 125, leads 126, 127 to pass through switch 128, lead 129, bus line 130 to said terminal bars 18ᵃ. The closing of switch 134 connects terminal bar 19ᵃ of contact strip 19, to the ground through leads 133 and switch 134. The terminal bars 18ᵃ and 19ᵃ are, however, as pointed out above, spaced apart so that the metering control circuit is not completed. It is to be noted that the contact 55 at this time is in its lowest position and disposed with its whiskers 58 and 59 in contact with terminal bars 18ᶜ and 19ᶜ.

The starting switch 140 is now closed, which allows the current flowing from rectifier 122 through leads 123 and 137, resistor 138 and lead 139 to pass through leads 141, 142 and solenoid 145 to the ground, which energizes solenoid 145, effecting a closing of the switches 148 and 152, shifting them from the position shown in Fig. 2 into contact with terminals 147 and 153, respectively. The current then runs from resistor 138 through lead 149, switch 148, lead 147, solenoid 145, lead 146 to the ground, thus completing a holding circuit by which the solenoid 145 is energized independently of the starting switch 140, which is thereupon released. The closing of switch 152 onto terminal 153 permits the current from rectifier 122 to flow through resistor 150, switch 152, lead 154, inflow relay solenoid 155, leads 156, 157, 159, 163, resistor 164, terminal bar 18ᶜ, contact 55, terminal bar 19ᶜ, lead 167 to the ground, energizing relay solenoid 155 and causing switches 170 and 117 to close. On the closing of switch 170 the current will flow from lead 156 through switch 170, lead 171 to the ground, thereby establishing a holding circuit for the inflow relay solenoid 155. The closing of switch 117 of the actuating circuit allows the current flowing from transformer 110 through leads 111 and 116 to pass to lead 118, solenoid of vent valve 74 to the ground, and also from lead 118 through lead 120, inflow valve solenoid 44, lead 121 to the ground, thereby energizing said solenoids and opening the vent and inflow valves 74 and 37 to admit fluid to the metering chamber 31. As the fluid enters the metering chamber 31 float 53 rises, carrying with it rod 54 which effects the upward sliding of the whiskers 58 and 59 of contact 55 within grooves 18ᵈ and 19ᵈ of contact rods 18 and 19.

When the whiskers 58 and 59 contact simultaneously energized terminal bar 18ᵃ and grounded terminal bar 19ᵃ, the metering control circuit is completed, reducing the amount of current flowing in the holding circuit through the resistor 138 to such an extent that the solenoid 145 is deenergized, whereupon the switches 148 and 152 resume the normal position shown in Fig. 2. The lifting of switch 152 from its terminal 153 breaks the flow of current through inflow relay solenoid 155, which effects opening of switches 170 and 117. The opening of switch 117 interrupts the flow of current to the solenoid of vent valve 74 and inflow valve solenoid 44, which causes the vent and inflow valves 74 and 37 to close, thereby stopping the flow of fluid into metering chamber 31.

The return of switch 152 to terminal 169 causes the reduced current flowing through resistor 150 and switch 152 to flow through terminal 169, leads 168, 163, 159, discharge relay solenoid 160 and lead 161 to the ground, thereby energizing discharge relay solenoid 160 and effecting the closing of switches 158 and 113. It is to be noted that contact 55 has now left terminal bars 18ᶜ and 19ᶜ so that the lead 163 is no longer grounded. The current also flows from terminal 151 of switch 152 through lead 162, switch 158, leads 157 and 159, discharge relay solenoid 160 and lead 161 to the ground, establishing a holding circuit for the solenoid 160.

The closing of switch 113 of the actuating circuit causes the current flowing from transformer 110 to flow through leads 111 and 112, switch 113, lead 114, solenoid of the compressed air valve 73, lead 115 to ground, energizing that solenoid and causing the compressed air valve 73 to open, thereby discharging from metering tube 31 through discharge pipe 64, the one ounce of fluid admitted.

This discharge of fluid causes the float 53 to drop within metering tube 31, and the associated contact 55 in response thereto once more assumes a position between terminals bars 18c and 19c which short circuits the holding circuit of outflow relay solenoid 160 by causing the current to flow from switch 158 to leads 157, 159 and 163, resistor 164, terminal bar 18c, contact 55, terminal bar 19c and lead 167 to ground. Switches 158 and 113 then open, interrupting the flow of current to compressed air inflow solenoid 73, thereby causing the compressed air valve 73 to close. On removal of card 107 the solenoids 104 in the selector circuit are deenergized, whereupon the switches 120 and 134 of the metering control circuit are opened. The apparatus has now returned to its original starting position and is ready for another cycle.

The discharge switch 143 is used only in case of emergency and acts when closed to break the holding circuit by short circuiting the solenoid 145, thereby opening switches 148 and 152. The inflow and vent valves 37 and 74 are thereupon closed, thereby stopping the admission of any further fluid into metering tube 31, and the compressed air valve 73 is opened to discharge the already admitted fluid from said metering tube 31.

The above electrical apparatus has been described in connection with the selection and delivery of one ounce but it is to be understood that the invention is not limited to this but that any number of ounces and any fraction thereof may be selected and delivered in the same manner. For example, if 2½ ounces are required by the given formula, the third hole from the bottom in the quarter ounce column 107ª of card 107 and the third hole from the bottom in the ounce column 107ᵇ would be punched. When the card 107 is placed between brushes 106 and 108, the selector circuit will operate to close appropriate switches on the proper metering control circuit to energize the terminal bars 18ᵉ of contact strip 18 and to ground the terminal bar 19ᵉ of contact strip 19. The apparatus will then perform exactly the same steps as above explained except that the contact 55, responsive to float 53, will rise to a higher point in guideway 20 before completing the metering control circuit, thereby allowing 2½ ounces to be admitted to metering tube 31 before discharge is effected.

It is to be noted that the invention is not limited to metering only quarter fractions of ounces, but may be constructed and arranged to meter other fractions of ounces by providing appropriate openings in the fraction ounce column 107ª of card 107, corresponding terminal bars 18ª on contact strip 18, and appropriate intermediate metering control circuits.

In the preferred embodiment of one aspect of the invention, wherein a plurality of metering units each containing an ingredient of a formula are under the control of selecting means common to the plurality of metering units, transformers 101, 110 and 122, and starting and discharge switches 140 and 143 are made common to the plurality of metering units by suitable leads 175, 176, 177 and 178, 179, 180 and 181, respectively, and each metering unit otherwise includes the same electrical apparatus as above described. The card 107 in turn includes a plurality of pairs of columns 107ª and 107ᵇ (see Fig. 15) corresponding to the number of metering units provided.

While desirable embodiments of the invention are here illustrated by way of example, it is to be understood that the invention is not necessarily limted to this precise construction but is to be regarded as broadly inclusive of any and all modifications such as fall within the scope of the appended claims.

We claim:

1. Apparatus for compounding a mixture by delivering measured ingredients, comprising a plurality of metering units each having ingredient supply means and electrically controlled metering means for measuring and subsequently delivering its respective ingredient and each including a series of control circuits corresponding to a series of measuring units to be delivered, a record card having means for partially establishing a selected control circuit of each metering unit, means controlled by each unit only when it is free of measured ingredient for initiating the operation of the measuring means of the unit, means controlled by the quantity of ingredient in the unit for completing said selected control circuit when the selected amount has been measured and means responsive to the completed control circuits for actuating each of said metering means to interrupt the measuring means and to deliver the number of measuring units corresponding to its selected control circuit.

2. Apparatus for compounding a mixture by delivering measured ingredients, comprising a plurality of metering units each having ingredient supply means and electrically controlled metering means for measuring and subsequently delivering its respective ingredient and each including a series of control circuits corresponding to a series of measuring units to be delivered each circuit being normally open at two points and each metering unit having a metering float for measuring the amount of ingredient in its unit carrying contact means for selectively closing any one of said first points of its series of control circuits, start contacts engaged by said float contact means when the float is in starting position, a card having means for closing a selected second point of each series of control circuit, means controlled by the start contacts for initiating operation of the measuring means only when the float is in its starting position, and means responsive to energization through said control circuits for actuating each of said metering means to measure and to deliver a number of measuring units selected by simultaneous closing of said two points of a control circuit through said contact means of the float which measures, upon reaching closing position, the amount of liquid selected by the control circuit closing means of said card.

3. Apparatus for delivering a measured amount of fluid comprising a closed measuring chamber having a metering float, means including an inlet port for supplying said fluid to said chamber, an inlet valve at said inlet port, an outlet port for the fluid substantially above the bottom of said chamber, air outlet means near the top of said chamber, a vent valve at said outlet means, means for supplying compressed air to said chamber, an air admission valve at said air supply means, initiating means for opening said inlet and said vent valves together while said air admission valve is closed, discharge means for opening said air admission valve upon closing said inflow and said vent valves, means for actuating said initiating means and for subsequently actuating said discharge means in response to said float upon admission of a predetermined amount of fluid through said inlet port, means controlled by the metering float when a measurable amount of fluid is present prior to actuation of said initiating means for preventing operation of said actuation means and for causing an operation of said discharge means.

4. Apparatus for delivering a measured amount of fluid comprising a closed measuring chamber having a metering float, said float having a normal starting level, means including an inlet port for supplying said fluid to said chamber, a solenoid controlled inlet valve at said inlet port, an outlet port for the fluid substantially above the bottom of said chamber, air outlet means near the top of said chamber, a solenoid controlled vent valve at said outlet means, means for supplying compressed air to said chamber, a solenoid controlled air admission valve at said air supply means, initiating means controlled by said float and effective only when the float is at its starting level for opening said inlet and said vent valves together while said air admission valve is closed, discharge means for opening said air admission valve upon closing said inflow and said vent valves, electrical control means including a series of control circuits corresponding to a series of measuring units, a record card for selecting and partially establishing a control circuit, contact means controlled by said float for completing any one of said partially established circuits, and means responsive to said control means for actuating said initiating means and for subsequently actuating said discharge means upon admission through said inlet port of an amount of fluid causing completion by said float of that control circuit which is partially established by said card.

ALBRECHT E. REINHARDT.
MATTHIJS G. J. BOISSEVAIN.
ASCHER H. SHAPIRO.
CHARLES A. CADY.